United States Patent
Kronzer et al.

(10) Patent No.: US 7,131,442 B1
(45) Date of Patent: Nov. 7, 2006

(54) FIBROUS FILTRATION FACE MASK

(75) Inventors: Joseph P. Kronzer, St. Paul, MN (US); James F. Dyrud, St. Paul, MN (US)

(73) Assignee: Minnesota Mining and Manufacturing Company, St. Paul, MN (US)

( * ) Notice: Subject to any disclaimer, the term of this patent is extended or adjusted under 35 U.S.C. 154(b) by 1016 days.

(21) Appl. No.: 08/661,834

(22) Filed: Jun. 11, 1996

Related U.S. Application Data

(60) Continuation of application No. 08/154,989, filed on Nov. 18, 1993, now abandoned, which is a division of application No. 07/632,964, filed on Dec. 20, 1990, now Pat. No. 5,307,796.

(51) Int. Cl.
*A62B 7/10* (2006.01)

(52) U.S. Cl. .......................... 128/205.27; 128/205.29; 128/206.12; 128/206.19; 128/206.21

(58) Field of Classification Search ........... 128/205.27, 128/205.28, 205.29, 206.12, 206.21, 206.19
See application file for complete search history.

(56) References Cited

U.S. PATENT DOCUMENTS

| | | | |
|---|---|---|---|
| 3,167,816 A | 2/1965 | Howard et al. ................. 18/19 |
| 3,225,768 A | 12/1965 | Galitzki et al. ............. 128/463 |
| 3,320,346 A | 5/1967 | Galitzki et al. ............. 264/229 |
| 3,765,998 A | 10/1973 | Oswald et al. ............... 428/338 |
| 3,799,174 A | 3/1974 | Howard ....................... 128/464 |
| 3,891,377 A | 6/1975 | Howard ....................... 425/383 |
| 4,258,093 A | 3/1981 | Benedyk ....................... 428/85 |
| 4,363,682 A * | 12/1982 | Thiebault .................... 156/181 |
| 4,536,440 A | 8/1985 | Berg ........................... 428/284 |
| 4,729,371 A | 3/1988 | Krueger et al. .......... 128/206.19 |
| 4,807,619 A * | 2/1989 | Dyrud et al. ........... 128/206.16 |
| 4,850,347 A | 7/1989 | Skov ...................... 128/206.16 |
| 4,892,695 A | 1/1990 | Bainbridge et al. .......... 264/122 |
| 4,921,645 A | 5/1990 | Insley ........................ 264/122 |
| 5,019,311 A | 5/1991 | Koslow ....................... 264/122 |
| 5,066,351 A | 11/1991 | Knoll .......................... 264/322 |
| 5,106,555 A | 4/1992 | Kobayashi et al. .......... 264/122 |
| 5,147,722 A | 9/1992 | Koslow ....................... 264/122 |
| 5,307,796 A * | 5/1994 | Kronzer et al. ......... 128/206.16 |

FOREIGN PATENT DOCUMENTS

| | | |
|---|---|---|
| EP | A-0038743 | 10/1981 |
| EP | A-0138549 | 4/1985 |
| EP | A-0264112 | 4/1988 |
| EP | 0121299 | 10/1990 |
| EP | A-0391726 | 10/1990 |
| GB | 966855 | 8/1964 |
| GB | 1002447 | 8/1965 |
| WO | WO-A-8910989 | 11/1989 |

OTHER PUBLICATIONS

Beauchamp, M., "His Cups Runneth Over", 139 Forbes 105 (Apr. 20, 1987).

* cited by examiner

*Primary Examiner*—Aaron J. Lewis
(74) *Attorney, Agent, or Firm*—Karl G. Hanson

(57) ABSTRACT

A face mask for filtering contaminants from the air. The face mask includes a harness for securing the mask over the nose and mouth of the wearer and a nonwoven fibrous layer attached to the harness. The nonwoven fibrous layer contains at least 40 weight percent thermally bonding fibers, where at least 10 weight percent of the fibers in the nonwoven fibrous layer are bicomponent fibers. The nonwoven fibrous layer is molded in a cup-shaped configuration and has a surface fuzz value of not less than 7.5 after being subjected to a surface fuzz abrasion test.

6 Claims, 3 Drawing Sheets

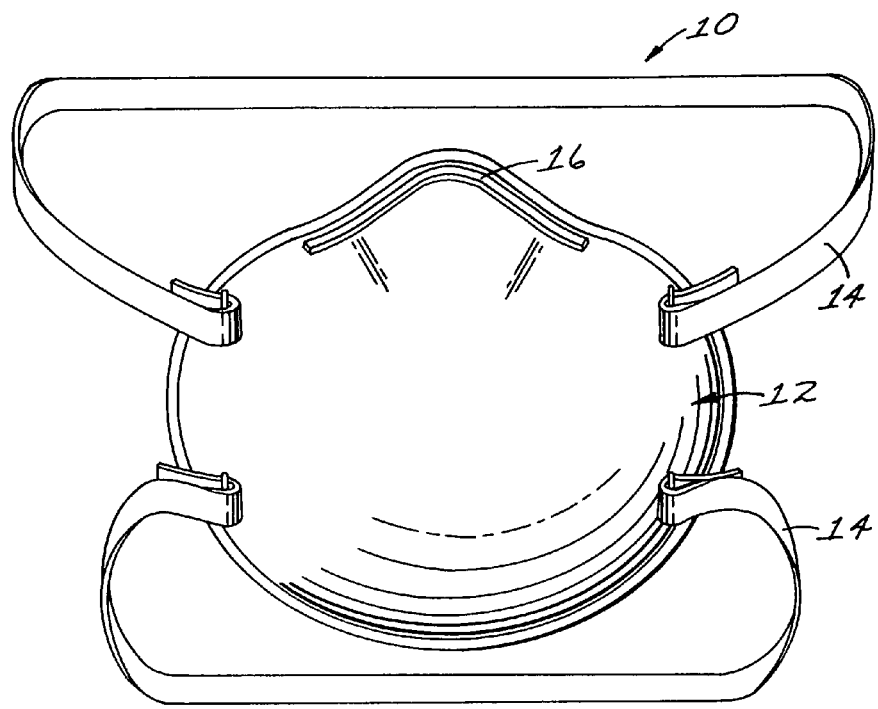
Fig. 1
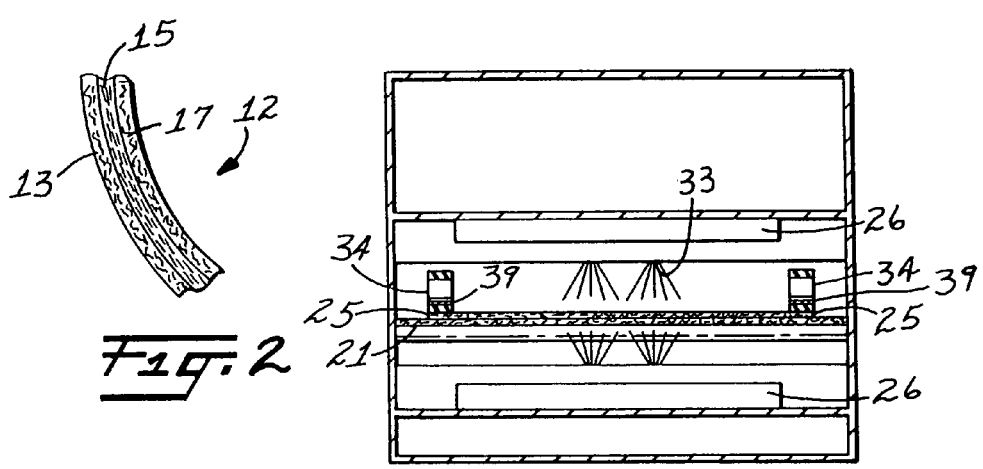
Fig. 2
Fig. 4

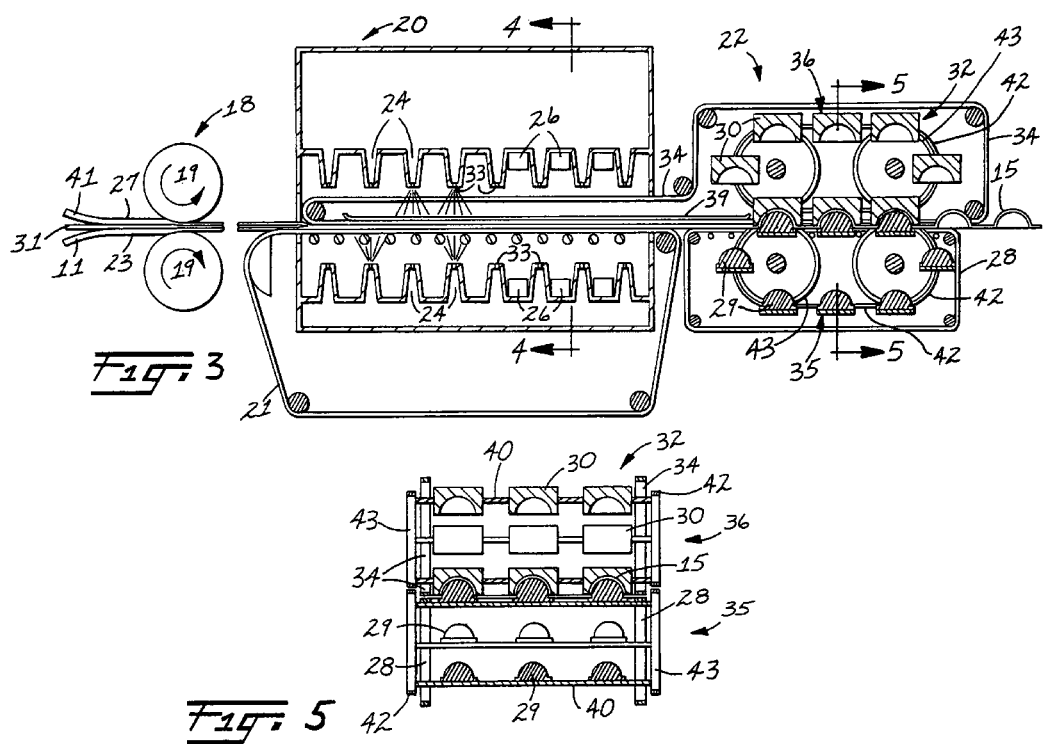

US 7,131,442 B1

FIBROUS FILTRATION FACE MASK

This is a continuation of application Ser. No. 08/154,989 filed Nov. 18, 1993 now abandoned, which is a division of application Ser. No. 07/632,964 filed Dec. 20, 1990 now U.S. Pat. No. 5,307,796 now abandoned.

FIELD OF THE INVENTION

This invention pertains to methods of forming fibrous-filtration-face-masks from non-woven webs of thermally bonding fibers. The invention also pertains to fibrous-filtration-face-masks made from non-woven webs of thermally bonding fibers, which masks maintain low degrees of surface fuzz after being subjected to abrasion.

BACKGROUND OF THE INVENTION

Fibrous-filtration-face-masks are well known in the respiratory art. Such face masks are worn over the breathing passages of a person and typically serve at least one of two purposes: (1) to prevent impurities or contaminants from entering the wearer's breathing tract; and (2) to protect others from being exposed to bacteria and other contaminants exhaled by the wearer. In the first situation, the mask would be worn in an environment where the air contains particles harmful to the wearer. In the second situation, the mask would be worn, for example, in an operating room to protect a patient from infection.

Fibrous-filtration-face-masks have been made from thermally bonding fibers. Thermally bonding fibers bond to adjacent fibers after being heated and cooled. Examples of face masks formed from such fibers are shown in U.S. Pat. Nos. 4,807,619 and 4,536,440. The face masks disclosed in these patents are cup-shaped masks that have at least one layer of thermally bonding fibers. The layer of thermally bonding fibers is termed a "shaping layer" and is used to provide shape to the mask and support for a filtration layer. Relative to the filtration layer, the shaping layer may reside on an inner portion of the mask (adjacent to the face of the wearer), or it may reside on an outer portion or on both inner and outer portions of the mask. Typically, the filtration layer resides outside the inner shaping layer.

The shaping layers disclosed in U.S. Pat. Nos. 4,807,619 and 4,536,440 have been made by molding non-woven webs of thermally bonding fibers in heated molds. The heated molds operate at temperatures above a softening point of the bonding component of the thermally bonding fibers. A web of thermally bonding fibers is placed in a heated mold and is subjected to pressure and heat to form a shaping layer for a face mask. This kind of molding operation is known as a "hot molding process".

There have been complaints from persons who have worn face masks made by hot molding non-woven webs of thermally bonding fibers. The wearers have indicated that the masks contain fuzz which touches the wearers' face and creates a tickling sensation, making them want to scratch that area of their face. If the mask is being worn to protect wearers from breathing impurities in the air or to protect others from infection, it becomes problematic for wearers to displace the mask from their face to relieve the itching sensation. Wearers must tolerate the itching sensation or risk exposing themselves or others to potentially dangerous substances. The present invention is directed to providing shaping layers for face masks which have improved surface fuzz properties.

GLOSSARY

As used herein:

"Bicomponent fiber" means a fiber composed of two or more components comprising different polymeric compositions having dissimilar softening temperatures, which components are arranged in separate and distinct regions along the length of the fiber;

"Binder fiber" means monofilament thermally bonding fibers;

"Preskinning" means to heat at least a surface of a fibrous web to a temperature that permits fibers on a surface of the web to become bonded to each other, the heating occurring before a molding operation in which the fibrous web is heated in its entirety and molded;

"Softening temperature" means the lowest temperature at which a fiber component is softened to an extent that permits that fiber component to bond to another fiber and retain that bonded condition when cooled;

"Staple fiber" means non-thermally bonding fibers;

"Thermally bonding fibers" mean fibers that bond to adjacent contacting fibers after being heated above their softening temperature and subsequently cooled.

SUMMARY OF THE INVENTION

This invention includes a method of forming a shaping layer for a face mask from a non-woven web containing thermally bonding fibers, where surface fuzz creation on the shaping layer of the face mask is greatly minimized. Surprisingly, it was discovered that improved surface fuzz properties can be obtained in a shaping layer by cold molding a non-woven fibrous web containing thermally bonding fibers, some of which are bicomponent fibers. A method of the invention comprises the steps: (a) heating a non-woven web of fibrous material that contains: (i) at least about forty weight-percent thermally bonding fibers based on the weight of the non-woven fibrous material, at least about ten weight-percent of the non-woven fibrous material being bicomponent fibers; and optionally (ii) staple fibers, to a temperature at which the thermally bonding fibers, including at least one component of the bicomponent fibers are softened; and then (b) molding the heated non-woven web of fibrous material, while the thermally bonding fibers and the at least one component of the bicomponent fibers are still soft, in a mold having molding members that are at a temperature below the softening temperatures of the thermally bonding fibers and all components of the bicomponent fibers. A preferred method for reducing surface fuzz creation includes an additional step of preskinning the web of non-woven fibrous material.

The present invention also includes a fibrous face mask that maintains a low degree of surface fuzz throughout normal use of the mask. The fibrous face mask comprises: (a) a means for securing the mask to the face of the wearer; and (b) a non-woven fibrous layer attached to the securing means and containing (i) at least about forty weight-percent thermally bonding fibers based on the weight of the fibers in the non-woven fibrous layer, at least about ten weight-percent of the fibers in the non-woven fibrous layer being bicomponent fibers, and (ii) optionally staple fibers, the non-woven fibrous layer being molded in a cup-shaped configuration and having a surface fuzz value of not less than 7.5 after being subjected to abrasion in a surface fuzz abrasion test as described below.

There are two important reasons for providing face masks that have improved surface fuzz properties. The first reason was indicated above: the fuzz is an irritant to the face of the wearer. The second reason (not any less important than the first) is that the fuzz can come loose from the mask and can be inhaled through the nostrils of the wearer or may get into the wearer's mouth. In addition, loose fuzz is particularly dangerous to a patient having an open wound, cut, or incision. If a physician is treating such a patient and is wearing a face mask to protect the patient from infection, and the mask has a high degree of surface fuzz, there is a greater risk that a fiber could become dislodged from the mask and fall into the open area. Accordingly, a primary object of this invention is to substantially reduce the creation of surface fuzz on a shaping layer of a face mask made from a non-woven web of thermally bonding fibers.

In addition to providing a face mask having improved surface fuzz properties, this invention provides new methods for forming face masks which possess superior operating characteristics over the prior art methods of hot molding non-woven webs of thermally bonding fibers. In known hot molding methods of forming fibrous filtration face masks, there is a tendency for fibers in the non-woven web to stick to the hot molds. When fiber sticking occurs, the molded shells deform upon opening of the molds. The shells will be permanently deformed upon cooling. The hot molding process therefore tends to generate excess quantities of fiber waste. Although sticking may be avoided in hot molding by carefully controlling the process parameters, the process window (variation in process conditions) is relatively narrow and becomes extremely difficult to control in a continuous process. Accordingly, another object of this invention is to provide a method of forming a shaping layer from a non-woven web of thermally bonding fibers, which method avoids fibers sticking to the molds.

The above and other objects, properties, and novel features of the invention are illustrated in the following description and accompanying drawings, where like reference numerals are used to designate similar parts. It is to be expressly understood, however, that the description and drawings are for the purposes of illustration only and should not be read in a manner that would unduly limit the scope of this invention.

BRIEF DESCRIPTION OF THE DRAWINGS

FIG. 1 is a front view of a face mask.

FIG. 2 is a cross-section of a face mask having shaping layers and a filtration layer.

FIG. 3 is a side view in partial cross-section of an apparatus for forming a face mask in accordance with the present invention.

FIG. 4 is a cross-section taken along lines 4—4 of FIG. 3.

FIG. 5 is a cross-section taken along lines 5—5 of FIG. 3.

FIG. 6 is a line graph illustrating surface fuzz values for shells obtained by hot molding and cold molding non-woven fibrous webs consisting of bicomponent and binder fibers.

DETAILED DESCRIPTION OF PREFERRED EMBODIMENTS OF THE PRESENT INVENTION

In describing preferred embodiments of the invention, specific terminology will be used for the sake of clarity. The invention, however, is not intended to be limited to the specific terms so selected, and it is to be understood that each term so selected includes all the technical equivalents that operate in a similar manner to accomplish a similar purpose.

In a face mask made from non-woven thermally bonding fibers, surface fuzz creation is minimized by forming a shaping layer for a face mask, where, throughout normal use of the mask, very few fibers rise a relatively short distance from the surface of the shaping layer. In a preferred embodiment of this invention, it has been discovered that such a shaping layer is formed by cold molding a non-woven web containing at least 40 weight-percent thermally bonding fibers, at least about 10 weight-percent of the fibers in the non-woven web are bicomponent fibers; the remaining thermally bonding fibers being binder fibers.

The non-woven web containing bicomponent fiber is first heated to a temperature that is equal to or above the softening temperature of the thermally bonding fibers, including at least one bonding component of the bicomponent fiber, but preferably, not above the melting temperature of the non-bonding component of the bicomponent fiber. Heating temperatures will vary depending on the composition of the thermally bonding fibers. In general, when using bicomponent fibers having a copolyester or copolyolefin bonding component, heating temperatures will range from about 110° C. (230° F.) to about 230° C. (450° F.).

After the non-woven web is heated, it is then placed in a molding apparatus before hardening of the thermally bonding fibers and the bicomponent fibers' softened component. The molding apparatus has cup-shaped molding members that are at a temperature below the softening temperature of the bonding components of the non-woven web. The molds are closed upon the heated fibrous web, the web takes the shape of the molds, and the thermally bonding fibers (including softened portions of the bicomponent fiber) harden. While in the molds, the non-woven web preferably is cooled to a temperature below the glass transition temperature of the web's bonding components. After molding, the molded non-woven web or shaping layer is removed from the molds. The resulting shaping layer has a permanent shape which conforms to a person's face, and maintains a low degree of surface fuzz.

In a preferred process for reducing surface fuzz creation, a shaping layer is formed by a method which also includes the step of preskinning the non-woven fibrous web. It was surprisingly discovered that by heating fibers on the surface of the non-woven web (so that those fibers become bonded to each other) before molding, fuzz resulting from normal abrasion may be further minimized. Using bicomponent fibers having a copolyester or copolyolefin bonding component, preferred preskinning temperatures are at from about 110° C. to 230° C. (230–450° F.), more preferably at from 120° C. to 170° C. (250–340° F.). Preskinning temperatures may vary depending upon factors such as the composition of the bonding component(s) of the non-woven web and the rate at which the fibrous material is passed through the preskinning stage.

An example of a face mask is shown in FIG. 1. Numeral 10 generally designates the face mask. Mask 10 has a shell or mask body 12, elastic bands 14, and a pliable dead-soft band 16 of metal such as aluminum. Elastic bands 14 are stapled or otherwise attached to mask body 12 to act as a harness for holding mask 10 over the wearer's face. Pliable dead soft band 16 permits mask 10 to be shaped and held in a desired fitting relationship on the nose of the wearer. Mask body 12 has a cup shape so that it stands out in spaced relation from the wearer's face and makes a snug low-pressure contact over the bridge of the nose, across the cheeks, and under the chin.

FIG. 2 illustrates an example of a cross-section of a mask body 12. Mask body 12 may have a plurality of layers, as indicated by numerals 13, 15, and 17. Layer 13 is an outer shaping layer, layer 15 is a filtration layer, and layer 17 is an inner shaping layer. Shaping layers 13 and 17 support filtration layer 15 and provide shape to mask body 12.

Although the term "shaping layers" is used in this description, shaping layers also have other functions, which in the case of an outermost layer may even be a primary function, such as protection of the filtration layer and prefiltration of a gaseous stream. Also, although the term "layer" is used, one layer may in fact comprise several sublayers, assembled to obtain desired thickness or weight. In some embodiments only one, generally inner, shaping layer is included in a face mask, but shaping may be accomplished more durably and conveniently if two shaping layers are used, for example, one on each side of the filtration layer as shown in FIG. 2. If only a low degree of filtration is needed, a face mask could comprise a shaping layer by itself; that is, without a filtration layer. The non-woven fibrous construction of the shaping layer provides it with a filtering capacity—although typically not as great as a filtering layer—which permits the shaping layer to screen out larger particles such as saliva from the wearer and relatively large particulate matter in the air.

A shaping layer contains fibers that have bonding components which allow the fibers to be bonded to one another at points of fiber intersection. The bonding components allow adjacent-contacting fibers to coalesce when subjected to heat and cooled. Such thermally bonding fibers typically come in monofilament and bicomponent form. Bicomponent fibers are the preferred fibers for use in forming shaping layers of this invention.

Suitable bicomponent fibers useful for forming shaping layers include, for example, coextensive side-by-side configurations, coextensive concentric sheath-core configurations such as MELTY fibers by Unitika Limited of Osaka, Japan, an SOFFIT fibers by Kuraray of Osaka, Japan (marketed by Chori America, Inc., Los Angeles), and coextensive elliptical sheath-core configurations such as CHISSO ES by Chisso, Inc. of Osaka, Japan (marketed by Marubeni Corp., New York, N.Y.). One particularly useful bicomponent fiber for producing the shaping layers of this invention has a generally concentric sheath-core configuration having a core of crystalline polyethylene terephthalate (PET) surrounded by a sheath of an amorphous copolyester polymer blend. This bicomponent fiber is manufactured by Unitika Limited and is sold as MELTY Type 4080 fiber. Another particularly suitable bicomponent fiber is a concentric sheath/core fiber having a core of crystalline PET and a sheath of a modified copolyolefin blend (such as the blend described in U.S. Pat. No. 4,684,576), which is marketed under the tradename CELBOND, Type 255, by Hoechst Celanese, Charlotte, N.C.

The fibers in the shaping layer are usually between 1 and 200 denier and preferably average greater than 1 denier but less than 50 denier. In preferred embodiments, the shaping layer(s) contains a mixture of synthetic staple fiber, preferably crimped, binder fiber, and bicomponent fiber. Shaping layers which maintain low degrees of surface fuzz can be prepared from fiber mixtures preferably having (1) staple and (2) binder fibers and bicomponent fibers in a weight-percent ratios ranging from 60:40 to 0:100. Preferably, the shaping layers consist essentially of at least about 20 weight-percent bicomponent fiber, zero to 80 weight-percent binder fiber, and zero to 60 weight-percent (better less than 50 weight-percent) staple fibers. More preferred shaping layers have at least 50 weight-percent bicomponent fiber, and more preferably at least 75 weight-percent bicomponent fiber. It has been found that a greater amount of bicomponent fiber in the web produces a shaping layer that has a lesser tendency to fuzz. Because bicomponent fibers typically are more expensive than binder and staple fibers, cost considerations may prescribe using less than 100 percent bicomponent fibers in the non-woven web.

In a less preferred embodiment, face mask shaping layers may be prepared without bicomponent fiber. In this embodiment, thermally bonding fibers, for example, binder fibers of a heat-flowable polyester may be included together with staple, preferably crimped, fibers in a non-woven fibrous web. The non-woven web containing thermally bonding binder fibers is preskinned before the heating and molding steps.

Binder fibers are typically made from polymeric materials that soften and bond to other fibers when heated and cooled. Binder fibers will typically retain their fibrous structure after bonding. Examples of binder fibers are KODEL Type 444 fibers made by Eastman Chemical of Kingsport, Tenn., and Type 259 fibers made by Hoechst Celanese of Charlotte, N.C. Upon heating of the non-woven web, the binder fibers soften and adhere to adjacent-contacting fibers. When the non-woven web is cooled in the molding step, bonds develop at fiber intersection points. Bonding components such as acrylic latex may also be applied to a web of fibers used to form a shaping layer (e.g., as a supplement to the bonding components of binder or bicomponent fibers). Also, bonding components in the form of powdered heat-activatable adhesive resins may be cascaded onto a web of fibers, whereupon when the web is heated the fibers in the web become bonded together at intersection points by the added resin. Shaping layers of the invention preferably are free from such added bonding components because they increase material and processing costs and can contribute to increased flammability of the finished face masks.

Staple fibers suitable for use in forming face mask shaping layers are non-thermally bonding fibers, typically, synthetic single component fibers such as fibers made from PET, nylon, and rayon. PET fibers are the more preferred staple fibers (such as TREVIRA Type 121 available from Hoechst Celanese, Charlotte, N.C.).

A non-woven web of fibers to be used as a shaping layer can be conveniently prepared on a RANDO WEBBER (Rando Corporation, Macedon, N.Y.) air-laying machine or a carding machine. The bicomponent fibers and other fibers are typically used in conventional staple lengths suitable for such equipment. Non-woven webs formed on air-laying or carding machines contain the fibers in a loose-unbonded-random orientation.

The fibers selected for use in the filtration layer depend upon the kind of particulate to be filtered. Particularly useful filtration fibers are webs of melt-blown fibers, such as those disclosed in Wente, Van A., "Superfine Thermoplastic Fibers", 48 *Industrial Engineering Chemistry,* 1342 et seq (1956). Webs of melt-blown fibers provide especially good filtration layers when used in a persistent electrically charged form (see U.S. Pat. No. 4,215,682 to Kubik et al). Preferably, these melt-blown fibers are microfibers having an average diameter of less than about 10 micrometers. Other particularly useful filtration fibers are electrically-charged-fibrillated-film-fibers as disclosed in U.S. Pat. No. RE 31,285 to Van Turnhout. Rosinwool fibrous webs and webs of glass fibers are also useful, as are solution blown, or electrostatically sprayed fibers, especially in microfiber form.

A preferred face mask of this invention has a filtration layer containing blown micro-fibers, preferably electrically-charged blown micro-fibers. This filtration layer is disposed between two shaping layers containing bicomponent fibers and staple fibers. The outer shaping layer has about 70 weight-percent bicomponent fibers and about 30 weight-percent staple fibers. The inner shaping layer contains about 60 weight percent bicomponent fibers and 40 weight percent staple fibers. The outer shaping layer provides a greater degree of support for the mask than the inner shaping layer and also tends to maintain a lower surface fuzz content because it contains a greater amount of bicomponent fiber.

FIG. 3 illustrates an apparatus for forming shells 15 for face masks in accordance with the methods of this invention. Shells 15 are produced by passing in superimposed relation a first non-woven fibrous web 11, a filtration layer 31, and a second non-woven fibrous web 41 through a preskinning stage 18, a heating stage 20, and a cold molding stage 22.

At preskinning stage 18, webs 11 and 41 are each heated to an extent that bonding components of fibers on surfaces 23 and 27 are softened. The lower surface 23 of web 11 and the upper surface 27 of web 41 contact heated calender rolls 19 to soften the bonding components of the fibers. Upon leaving calender rolls 19, the softened components of the fibers harden, and the fibers on surfaces 23 and 27 become bonded to each other. Webs 11 and 41 and filtration layer 31 are then placed on a moving oven belt 21 and enter heating stage 20.

At heating stage 20, intra-red (IR) heaters 26 and hot air impingement 24 through perforations 33 heat the thermally bonding fibers in webs 11 and 41 to soften the bonding components of the fibers throughout the webs. Oven belt 21 has a mesh construction which permits IR heat 26 and hot air impingement 24 to strike surface 23.

After heating, webs 11 and 41 and filtration layer 31 are passed to cold molding stage 22 while the bonding components of the fibers in webs 11 and 41 are still soft. Webs 11 and 41 and filtration layer 31 are carried on belts 28 and are placed between unheated molding members 29 and 30 and are then molded to the shape of face masks 15. A ferris wheel type arrangement 32 may be employed to provide a continuous molding process. Ferris wheel arrangement 32 includes a first and a second rotating apparatus, 35 and 36 respectively. Male molding members 29 are located on bars 40 of rotating apparatus 35, and female molding members 30 are located on bars 40 of rotating apparatus 36. Molding members 29 and 30 turn in a clockwise rotation and are each driven by a chain 42 on sprockets 43. At the point of molding, members 29 and 30 come together to shape webs 11 and 41 into cup-shaped shells 15.

Although preskinning is accomplished in the method shown in FIG. 3 by passing the non-woven webs through calender rolls 19, preskinning could also be accomplished, for example, by using other heating means such as IR heaters, heated bars, or the like. Calender rolls are preferred, however, because the preskinning temperatures can be more easily controlled and pressure from the rolls presses stray fibers inwardly towards the web. When using calender rolls, it is preferred that the rolls are gapped. The gap between the rolls preferably is large enough to avoid web handling problems associated with calendering, but is small enough to permit fiber bonding on the surface of the web. The gap preferably is less than the thickness of the non-woven web. In general, the rolls would be gapped at about one to sixteen millimeters. The temperature of the calender rolls should be great enough to soften the fibers, but should not be so hot as to melt the fibers. The non-woven webs should not be preskinned to an extent that the pressure drop of an airstream through the resulting shaping layer is substantially greater than the pressure drop through a non-preskinned shaping layer.

In the method of this invention, non-woven webs of thermally bonding fibers are subject to shrinkage during the heating stage. The non-woven webs tend to contract inwardly when exposed to heat. Web shrinkage should be avoided so that a greater amount of shells can be formed from a particular web. It therefore is preferred that a means for preventing web shrinkage be employed in the present invention. Such a means may include, for example, pins, hooks, or belts that would secure the edges of the web(s) as it moved through the heating stage. The web could also be restrained from contracting by pinning it to the oven or conveyor belt with air impingement. To a limited extent, preskinning will also retard web shrinkage during the heating stage.

An example of a means for preventing web shrinkage is shown in FIGS. 3 and 4. Edge belts 34 are employed there to secure edges 25 of webs 11 and 41. As webs 11 and 41 pass through heating stage 20 on oven belt 21, edges 25 are pinned to oven belt 21 by pressure executed from edge belts 34 and shoe 39. This pressure continues to be applied until the molds close upon the webs.

Instead of using edge belts 34, pins or hooks could be employed on belt 21 to prevent a non-woven fibrous web from contracting during the heating step. Additionally, or in lieu thereof, air impingement may be used at the heating stage to secure the non-woven web against the oven belt. As a restraining means, air impingement is preferably employed on only one side of the non-woven web. If air impingement is applied on both sides of a web, the web tends to float: it is not secured to the oven belt in a manner that prevents contracting. A preferred method of air impingement is to place the air impingement nozzles on one side of the web between the IR heaters.

If a shaping layer is being molded by itself, any web restraining means may be employed. If, however, a shaping layer is being molded in conjunction with a filtration layer, it is preferred that edge belts, hooks, or pins be used to restrain the non-woven web.

Objects, features, and advantages of this invention are further illustrated in the following examples. It is to be expressly understood, however, that while the examples serve this purpose, the particular ingredients and amounts used, as well as other conditions and details, are not to be construed in a manner that would unduly limit the scope of this invention.

EXAMPLES

In the following examples, cup-shaped shaping layers were formed using cold and hot molding techniques and various fiber blends. The shaping layers were tested for surface fuzz after being subjected to abrasion, and the results of those tests are tabulated in Table 1. In FIG. 5, a comparison of surface fuzz values for cold and hot molded fibrous shells is illustrated. The data plotted in FIG. 5 is for shells consisting of bicomponent and binder fibers. Line 37 indicates surface fuzz values for hot molded shells, and line 38 indicates surface fuzz values for cold molded shells.

Examples 1–20

In these examples, non-woven fibrous webs were cold molded. The molded non-woven webs contained bicomponent fibers that had a PET core surrounded by a sheath of a copolyester blend. In some of the examples, the fibrous web was preskinned. In other examples, there was no preskinning step. Examples 1–20 demonstrate that surface fuzz creation is reduced with preskinning and increasing bicomponent fiber content. The examples also demonstrate that surface fuzz creation is further reduced with increasing preskinning temperatures. In all of these examples, the molded fibers did not stick to the molds.

Example 1 (No Preskinning)

A non-woven fibrous web composed of 100 percent bicomponent MELTY Type 4080 fibers formed in a RANDO WEBBER air-laying machine was molded into shaping layers. The web was heated to a temperature of approximately 190° C. by simultaneously applying hot air and infra-red heat to the web. Hot air impinged upon the top of the web and IR heat was applied to the top and bottom of the web. After heating, the hot web was molded by placing it between cup-shaped unheated male and female molds. Four shells were randomly selected and were then tested for surface fuzz. These shells had a calculated average fuzz value of 9.5

Surface Fuzz Abrasion Test

The fuzz values were determined as follows:

Each molded shell was placed on a cup-shaped mandrel and was subjected to abrasion by dragging a stiff, flat brush over a surface of the face mask from the base of one side to the base of an opposing side. A total force of approximately 1.3 Newtons was exerted by the brush on each shell. The brush employed was a SCRUBTEAM 1876 (nondetergent version) brush available from 3M, Medical-Surgical Products Division, St. Paul, Minn. A SCRUBTEAM brush has polypropylene bristles about 0.18 mm in diameter extending 1 cm from a resin layer into which they are embedded at a density of about 240 bristles per $cm^2$. An arc of 50 mm in length with its center at the apex of each molded shell was examined by two independent examiners to determine the number of loose fibers and the height of the loose fibers (in millimeters). From the number and height of the fibers and the following Surface Fuzz Value Scale, a surface fuzz value was obtained for each shell by each independent examiner. These two values were then averaged for each examined shell and the values for each of the four shells were then averaged. The final surface fuzz value was obtained and is tabulated in the last column of Table 1.

The scale is used in the following manner. When an examined shell has a maximum fiber height and maximum fiber number which both fall within the ranges given for a particular fuzz value, the shell receives that fuzz value. For example, a shell would receive a fuzz value of 9.0 when its highest fibers are 1 mm in length and are 11 in number. When an examined shell has a fiber height range and fiber number which fall under different fuzz values, the shell receives the average of those fuzz values. For example, a shell would be given a fuzz value of 8.5 when its highest fibers are determined to be 3 mm in length and are 11 in number.

Example 2 (Preskinning)

A shaping layer was prepared and tested using the procedures described in Example 1, except the non-woven web was preskinned between 9–10 mm gapped hot calendar rolls at 132° C. (270° F.) before heating. Results are tabulated in Table 1.

Example 3 (Preskinning)

A shaping layer was prepared and tested using the procedures described in example 2, except the non-woven web was preskinned between 9–10 mm gapped hot calendar rolls at 154° C. (310° F.). Results are tabulated in Table 1.

Examples 4, 7, 10, 13, and 16 (No Preskinning)

Shaping layers were prepared and tested using the procedures described in Example 1, except different fiber mixtures were used in the non-woven fibrous web. The fiber mixtures and surface fuzz results are tabulated in Table 1.

Examples 5, 8, 11, 14, and 18 (Preskinning)

Shaping layers were prepared and tested using the procedures described in Example 2, except different fiber mixtures were used in the non-woven fibrous web. The fiber mixtures and surface fuzz results are tabulated in Table 1.

Examples 6, 9, 12, 15, and 20 (Preskinning)

Shaping layers were prepared and tested using the procedures described in Example 3, except different fiber mixtures were used in the non-woven fibrous web. The fiber mixtures and surface fuzz results are tabulated in Table 1.

Examples 17 and 19 (Preskinning)

Shaping layers were prepared and tested using the procedures described in Example 1, except: (1) the non-woven fibrous webs comprised 62 wt. % MELTY Type 4080 bicomponent fiber, 22 wt. % Type 444 binder fiber, and 16 wt. % PET staple fibers; and (2) the webs were preskinned between 9–10 mm gapped hot calendar rolls at 121° C. (250° F.) and 143° C. (290° F.) respectively. The surface fuzz results are tabulated in Table 1.

| | SURFACE FUZZ VALUE SCALE | | | | | | | | | |
|---|---|---|---|---|---|---|---|---|---|---|
| Fuzz Value | 1 | 2 | 3 | 4 | 5 | 6 | 7 | 8 | 9 | 10 |
| Fiber Height (mm) | >15 | >13–15 | >10–13 | >7–10 | >4–7 | >3–4 | >2–3 | >2–3 | 0–2 | 0–2 |
| Fiber Number | >200 | >200 | >200 | >200 | >200 | 101–200 | 51–100 | 26–50 | 11–25 | 0–10 |

Examples 21–23 (Type 255 Bicomponent Fiber)

In these examples bicomponent fibers different from the bicomponent fibers in the previous examples were used in the non-woven fibrous web: CELBOND Type 255 bicomponent fiber was used. The fibrous web comprised 62 wt. % CELBOND Type 255 bicomponent fiber, 22 wt. % 444 binder fiber, and 16 wt. % TREVIRA PET staple fiber. In Example 21 there was no preskinning. In Examples 22 and 23, the non-woven fibrous webs were preskinned between 9–10 mm gapped hot calendar rolls at 143° C. (290° F.) and 166° C. (330° F.) respectively. All the samples were cold molded. The surface fuzz values were 6.6, 8.0, and 8.0 respectively. This data is tabulated in Table 1.

Examples 21–23 demonstrate that surface fuzz may be reduced by cold molding fibrous webs containing bicomponent fibers having a sheath of a modified copolyolefin and a core of crystalline PET. These examples also demonstrate that preskinning further reduces surface fuzz.

Examples 24–26 (Comparative Samples)

In these examples, a shaping layer was formed by hot molding a non-woven fibrous web containing MELTY Type 4080 bicomponent fibers. In example 26 the non-woven web contained 100 wt. % MELTY Type 4080 bicomponent fibers, in example 25 the web contained 85 wt. % MELTY Type 4080 bicomponent fiber and 15 wt. % KODEL TYPE 444 binder fiber, and in example 24 the web contained 70 wt. % MELTY Type 4080 fiber and 30 wt. % KODEL Type 444 binder fiber. Each of these webs were placed between molds that were heated to a temperature of about 120° C. (250° F.) for approximately six seconds. Six shells were randomly selected from each molded web, each shell was tested for surface fuzz, and the average fuzz values for each group of six shells were determined. The tests were performed in the manner described in example 1.

The webs' composition and fuzz values are tabulated in Table 1. A comparison of the results of these examples with examples 1–23 demonstrate that the method of the present invention provides unexpected superior results over hot molding processes for forming shaping layers of thermally bonding fibers. The results are illustrated in FIG. 5.

TABLE 1

| Example | MELTY Type 4080 Bicomponent 4 denier | CELBOND Type 255 Bicomponent 3 denier | KODEL Type 444 Binder 3.5 denier | TREVIRA Type 121 PET Staple 1.75 denier | Calender Temp. (° F.) | Avg. Fuzz (1–10) |
|---|---|---|---|---|---|---|
| 1 | 100 | — | — | — | — | 9.5 |
| 2 | 100 | — | — | — | 270 | 9.8 |
| 3 | 100 | — | — | — | 310 | 9.9 |
| 4 | 50 | — | 50 | — | — | 9.1 |
| 5 | 50 | — | 50 | — | 270 | 9.5 |
| 6 | 50 | — | 50 | — | 310 | 9.6 |
| 7 | 50 | — | — | 50 | — | 7.6 |
| 8 | 50 | — | — | 50 | 270 | 8.1 |
| 9 | 50 | — | — | 50 | 310 | 8.4 |
| 10 | 20 | — | 80 | — | — | 8.4 |
| 11 | 20 | — | 80 | — | 270 | 8.6 |
| 12 | 20 | — | 80 | — | 310 | 9.5 |
| 13 | — | — | 80 | 20 | — | 1.4 |
| 14 | — | — | 80 | 20 | 270 | 1.5 |
| 15 | — | — | 80 | 20 | 310 | 1.6 |
| 16 | 62 | — | 22 | 16 | — | 7.3 |
| 17 | 62 | — | 22 | 16 | 250 | 7.9 |
| 18 | 62 | — | 22 | 16 | 270 | 8.5 |
| 19 | 62 | — | 22 | 16 | 290 | 8.5 |
| 20 | 62 | — | 22 | 16 | 310 | 8.9 |
| 21 | — | 62 | 22 | 16 | — | 6.6 |
| 22 | — | 62 | 22 | 16 | 290 | 8.0 |
| 23 | — | 62 | 22 | 16 | 330 | 8.0 |
| 24 | 70 | — | 30 | — | — | 5.0 |
| 25 | 85 | — | 15 | — | — | 6.0 |
| 26 | 100 | — | — | — | — | 8.0 |

Various modifications and alterations of this invention will become apparent to those skilled in the art without departing from the scope and spirit of this invention. It therefore should be understood that this invention is not to be unduly limited to the illustrative embodiments set forth above, but is to be controlled by the limitations set forth in the claims and equivalents thereof.

We claim:

1. A fibrous filtration face mask for filtering contaminants and/or particulate matter, which comprises:
    (a) a means for securing the mask to the face of the wearer; and
    (b) a non-woven fibrous layer attached to the securing means and containing (i) at least about 40% thermally bonding fibers based on the weight of the fibers in the non-woven fibrous layer, at least about 10 wt. % of the fibers in the non-woven fibrous layer being bicomponent fibers, and optionally (ii) staple fibers, the non-woven fibrous layer being molded in a cup-shaped configuration and having a surface fuzz value of not less than 9.0 regardless of bicomponent fiber content.

2. A fibrous filtration face mask for filtering contaminants and/or particulate matter, which comprises:
    (a) a means for securing the mask to the face of the wearer; and
    (b) a non-woven fibrous layer attached to the securing means and containing (i) at least about 40% thermally bonding fibers based on the weight of the fibers in the non-woven fibrous layer, at least about 10 wt. % of the fibers in the non-woven fibrous layer being bicomponent fibers, and optionally (ii) staple fibers, the non-woven fibrous layer being molded in a cup-shaped configuration and having a surface fuzz value of not less than 8.4 regardless of bicomponent fiber content.

3. A fibrous filtration face mask, which comprises:
    (a) a harness; and
    (b) a nonwoven fibrous layer attached to the harness and containing at least 40 weight percent thermally bonding fibers based on the weight of the fibers in the nonwoven fibrous layer, at least 10 weight percent of the fibers in the nonwoven fibrous layer being bicomponent fibers, the non-woven fibrous layer being molded in a cup-shaped configuration and having a surface fuzz value of not less than 8.4 regardless of bicomponent fiber content after being subjected to a surface fuzz abrasion test; and wherein the nonwoven fibrous layer contains at least 20 weight percent bicomponent fibers.

4. A fibrous filtration face mask for filtering contaminants and/or particulate matter, which comprises:
   (a) a means for securing the mask to the face of the wearer; and
   (b) a non-woven fibrous layer attached to the securing means and containing (i) at least about 40% thermally bonding fibers based on the weight of the fibers in the non-woven fibrous layer, at least about 10 wt. % of the fibers in the non-woven fibrous layer being bicomponent fibers, and optionally (ii) staple fibers, the non-woven fibrous layer being molded in a cup-shaped configuration and having a surface fuzz value of not less than 9.5 regardless of bicomponent fiber content.

5. A fibrous filtration face mask, which comprises:
   (a) a harness; and
   (b) a nonwoven fibrous layer attached to the harness and containing at least 40 weight percent thermally bonding fibers based on the weight of the fibers in the nonwoven fibrous layer, at least 10 weight percent of the fibers in the nonwoven fibrous layer being bicomponent fibers, the non-woven fibrous layer being molded in a cup-shaped configuration and having a surface fuzz value of not less than 9.0 regardless of bicomponent fiber content.

6. A fibrous filtration face mask, which comprises:
   (a) a harness; and
   (b) a nonwoven fibrous layer attached to the harness and containing at least 40 weight percent thermally bonding fibers based on the weight of the fibers in the nonwoven fibrous layer, at least 10 weight percent of the fibers in the nonwoven fibrous layer being bicomponent fibers, the non-woven fibrous layer being molded in a cup-shaped configuration and having a surface fuzz value of not less than 9.1 regardless of bicomponent fiber content.

* * * * *

UNITED STATES PATENT AND TRADEMARK OFFICE
CERTIFICATE OF CORRECTION

PATENT NO.         : 7,131,442 B1                                     Page 1 of 1
APPLICATION NO. : 08/661834
DATED              : November 7, 2006
INVENTOR(S)        : Joseph P. Kronzer It is certified that error appears in the above-identified patent and that said Letters Patent is hereby corrected as shown below:

<u>Column 5</u>
Line 36, delete "an" and insert --and-- therefor.

<u>Column 7</u>
Line 28, delete "intra-red" and insert --infra-red-- therefore.

<u>Column 11</u>
Line 28, after "KODEL" delete "TYPE" and insert --Type--therefor.

Signed and Sealed this

Thirteenth Day of March, 2007

JON W. DUDAS
*Director of the United States Patent and Trademark Office*